(12) United States Patent
Mahkonen et al.

(10) Patent No.: US 7,324,597 B2
(45) Date of Patent: Jan. 29, 2008

(54) TRANSCODING OF VIDEO SIGNALS

(75) Inventors: Arto Mahkonen, Helsinki (FI); Kaisa Kettunen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 853 days.

(21) Appl. No.: 10/471,313

(22) PCT Filed: Mar. 4, 2002

(86) PCT No.: PCT/EP02/02483

§ 371 (c)(1),
(2), (4) Date: Sep. 9, 2003

(87) PCT Pub. No.: WO02/073972

PCT Pub. Date: Sep. 19, 2002

(65) Prior Publication Data

US 2005/0213664 A1    Sep. 29, 2005

(30) Foreign Application Priority Data

Mar. 10, 2001    (GB) .................................. 0105970.8

(51) Int. Cl.
H04N 7/12 (2006.01)
H04N 11/02 (2006.01)

(52) U.S. Cl. .............................. 375/240.17; 375/240.25

(58) Field of Classification Search ........... 375/240.17, 375/240.25
See application file for complete search history.

(56) References Cited

U.S. PATENT DOCUMENTS

| | | | | |
|---|---|---|---|---|
| 5,907,374 A | * | 5/1999 | Liu ........................ | 375/240.26 |
| 6,625,211 B1 | * | 9/2003 | Etoh et al. ............. | 375/240.03 |
| 6,826,231 B2 | * | 11/2004 | Takahashi et al. ..... | 375/240.16 |
| 2001/0047517 A1 | * | 11/2001 | Christopoulos et al. ....... | 725/87 |

OTHER PUBLICATIONS

Video transcoding technology for wireless communication systems, Iwasaki et al., Vehicular Technology Conference Proceedings, 2000. VTC 2000-Spring Tokyo. 2000 IEEE 51st vol. 2, May 15-18, 2000 pp. 1577-1580 vol. 2 Digital Object Identifier 10.1109/VETECS.2000.851392.*

* cited by examiner

Primary Examiner—Gims Philippe
Assistant Examiner—Erick Rekstad

(57) ABSTRACT

A method of transcoding from H.263 coded video frames to H.261 coded video frames, the method comprising for each INTER coded macro block (MB) of each frame, determining whether a component of the motion vector (MV) of the MB has a half pixel value, if yes, carrying out a MV search using the current H.263 decoded MB and a previous decoded frame to determine a new MV, the MV search being restricted to the vicinity of the H.263 coded MV, and coding the MB into an H.261 format using the new MV.

12 Claims, 3 Drawing Sheets

TRANSCODING OF VIDEO SIGNALS

FIELD OF THE INVENTION

The present invention relates to the transcoding of video signals and in particular to transcoding between H.263 and H.261 coded video signals.

BACKGROUND TO THE INVENTION

A number of video coding standards have recently been specified. A main purpose of these standards is to compress data to reduce the bandwidth required to transmit video signals over a communications link. State of the art ISDN video telephony terminals typically use the H.261 video coding algorithm specified by the Technical division of the International Telecommunications Union (ITU-T), whilst terminals for use with the proposed third generation 3GPP mobile networks will use the H.263 video coding algorithm specified by that same body. It will be necessary to ensure interworking of these two terminal types. The current proposals achieve interworking by providing in the communication networks a transcoder which uses a "brute force" method to first of all completely decode a video signal coded using a first of the algorithms (H.263 or H.261), and then to recode the decoded signal using the second of the algorithms. Transcoding between other video coding standards also often requires a similar brute force method. Transcoding in this way requires a great deal of processing power in the transcoder (where a great many signals may require simultaneous transcoding) which is costly in terms of network hardware. Transcoding is also time consuming, increasing transmission delay and degrading the perceived quality for delay sensitive applications such as conversational video telephony.

STATEMENT OF THE INVENTION

The present invention takes advantage of the common elements of video coding algorithms to reduce the computational intensity of the transcoding process. In particular, the need for a full motion vector search is avoided during transcoding.

According to a first aspect of the present invention there is provided a method of transcoding from H.263 coded video frames to H.261 coded video frames both of which comprise VLC parameters, the method comprising for each INTER coded macro block (MB) of each frame:

determining whether a component of the motion vector (MV) of the MB has a half pixel value, or if both components of the MV have an even pixel value;

if both components have an even pixel value, performing said transcoding by converting the H.263 VLC parameters into H.261 VLC parameters without performing a new MV search; and if a component has a half pixel value, carrying out a MV search using the current H.263 decoded MB and a previous decoded frame to determine a new MV, the MV search being restricted to the vicinity of the H.263 coded MV, and coding the MB into an H.261 format using the new MV.

It will be appreciated that embodiments of the present invention significantly reduce the computational intensity of the transcoding process. The need for a MV search is either avoided completely (where the components of the H.263 coded MV are both integers) or the extent of the MV search is significantly reduced (from for example 32×32 MV candidates to 2 or 4 MV candidates).

Preferably, said previous decoded frame is the previously coded H.261 frame (i.e. that frame last processed by the transcoder) once more decoded according to the H.261 standard in the transcoder.

Preferably, when a new MV search is carried out, said vicinity of the MV consists of the two integer pixel locations on each side of the half pixel component. Where both components of the H.263 coded MV have a half pixel value, the vicinity consists of the four integer pixel locations surrounding the MV.

Preferably, said step of coding the frame into an H.261 format using the new MV comprises calculating a residual for each of the luminance and chrominance blocks by subtracting the corresponding blocks of the previous decoded frame, shifted by the new MV or a value derived from that new MV, from the current H.263 decoded blocks. The residuals are then DCT coded. The DCT coefficients are then quantised, zig-zag scanned, run length encoded, and VLC coded. Other parameters are also VLC coded. More preferably, in calculating the residuals for the colour blocks, the blocks of said previous decoded frame are shifted by amounts which are the component values of the new MV divided by 2 and truncated (due to the fact that that the resolution of the colour blocks is decimated by 2 in both dimensions).

Preferably, if both components of the H.263 coded MV of a MB are integers, but at least one is odd, the residuals for the colour blocks (Cb and Cr) are recalculated using a MV which is the value of the original MV divided by 2 and truncated. The MB is then coded by determining DCT coefficients for the new residuals. There is however no need for a further MV search, nor is there a need to recalculate residuals for the luminance blocks.

It is noted that if both MV components have an even pixel value, no MV search or recalculation of residuals or DCT coefficients is required.

For MBs for which recalculation of residuals is required because at least one of the components of the H.263 coded MV has a half pixel value, loop filtering may be applied to the corresponding MV shifted block of the previous frame prior to subtracting it from the current H.263 decoded block.

According to a second aspect of the present invention there is provided a method of transcoding between H.263 coded video frames and H.261 coded video frames, the method comprising for each INTER coded macro block (MB) of each frame:

determining whether or not the motion vector (MV) for that block comprises a component which is an odd integer and, if so, recalculating the residuals for at least the colour blocks of the MB.

According to a third aspect of the present invention there is provided a method of transcoding from H.261 coded video frames to H.263 coded video frames, the method comprising for each INTER coded macro block (MB) of each frame:

determining whether or not loop filtering was used to generate the H.261 coded MB;

if yes, calculating a new residual for each of the luminance and colour blocks without applying a loop filter to the corresponding decoded MB of the previous frame; and coding the frame in an H.263 format.

The quality of the transcoding may be improved if the previous frame is the H.263 coded and decoded frame, as compared to the decoded H.261 coded frame.

Further if loop filtering was used and one or both of the H.261 coded MV components is an odd integer, a bilinear interpolation may be used to handle the half pixel resolution of H.263 coding for the colour blocks.

If loop filtering has not been used when H.261 coding a given MB, it may not be necessary to recalculate residuals for the colour and luminance blocks, compute DCT coefficients etc. However, a further check may be carried out to determine whether or not either of the H.261 coded MV components is an odd integer. If so, residuals may be recalculated for the colour blocks using the corresponding blocks of the previous frame shifted by half of the MV and using a bilinear interpolation to handle the half pixel resolution used by H.263 coding.

Preferably, bilinear interpolation is used to handle the half pixel resolution of the H.263 coding.

According to a fourth aspect of the present invention there is provided a transcoder for providing an interface between an H.263 capable video telephony terminal and an H.261 capable video telephony terminal, the transcoder being arranged to implement one or more of the above first to third aspects of the present invention.

According to a fifth aspect of the present invention there is provided a method of transcoding from H.261 coded video frames to H.263 coded video frames, the method comprising for each inter coded macro block (MB) of each frame:
  conducting a MV search using a previous decoded frame, the search being restricted to the 8 half pixel resolution shifts in the vicinity of the H.261 full pixel resolution MV.

According to a sixth aspect of the present invention there is provided a method of transcoding from H.261 coded video frames to H.263 coded video frames, the method comprising for each inter coded macro block (MB) of each frame, coded using a loop filter on the originating H.261 side:
  conducting a MV search using a previous decoded frame, the search being restricted to the 8 half pixel resolution shifts in the vicinity of the H.261 full pixel resolution MV.

According to a seventh aspect of the present invention there is provided a method of transcoding video frames from a first video coding format to a second video coding format, wherein both formats can represent a macro block (MB) of a given frame using a motion vector (MV) defining a displacement of the MB relative to a preceding frame, and wherein the first format specifies MV components to a resolution of a half pixel and the second format specifies MV components to a resolution of one pixel, the method comprising for each INTER coded macro block (MB) of each frame:
  determining whether a component of the motion vector (MV) of the MB has a half pixel value, or if both components of the MV have an even pixel value;
  if both components have an even pixel value, performing said transcoding by converting the first format VLC parameters into second format VLC parameters without performing a new MV search; and
  if a component has a half pixel value, carrying out a MV search using the current first format decoded MB and a previous decoded frame to determine a new MV, the MV search being restricted to the vicinity of the first format coded MV, and coding the MB into the second format using the new MV.

DETAILED DESCRIPTION OF A PREFERRED EMBODIMENT

Figure 1:
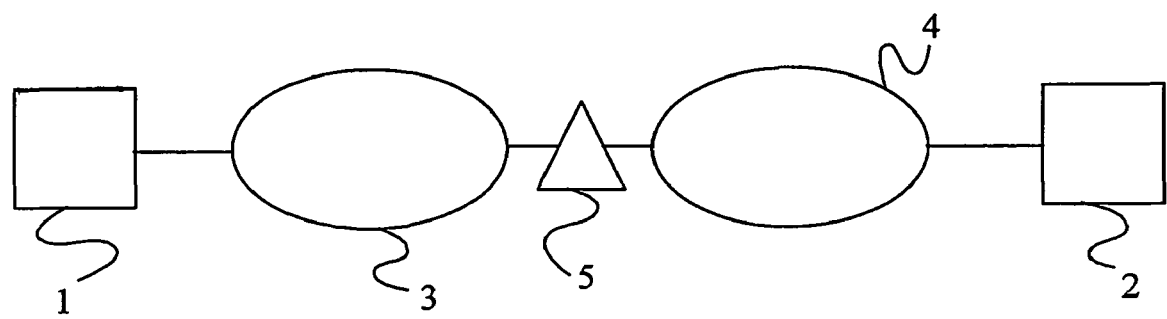
FIG. 1 illustrates schematically a system for communicating video signals between an ISDN terminal and a 3GPP mobile terminal.
Figure 2:
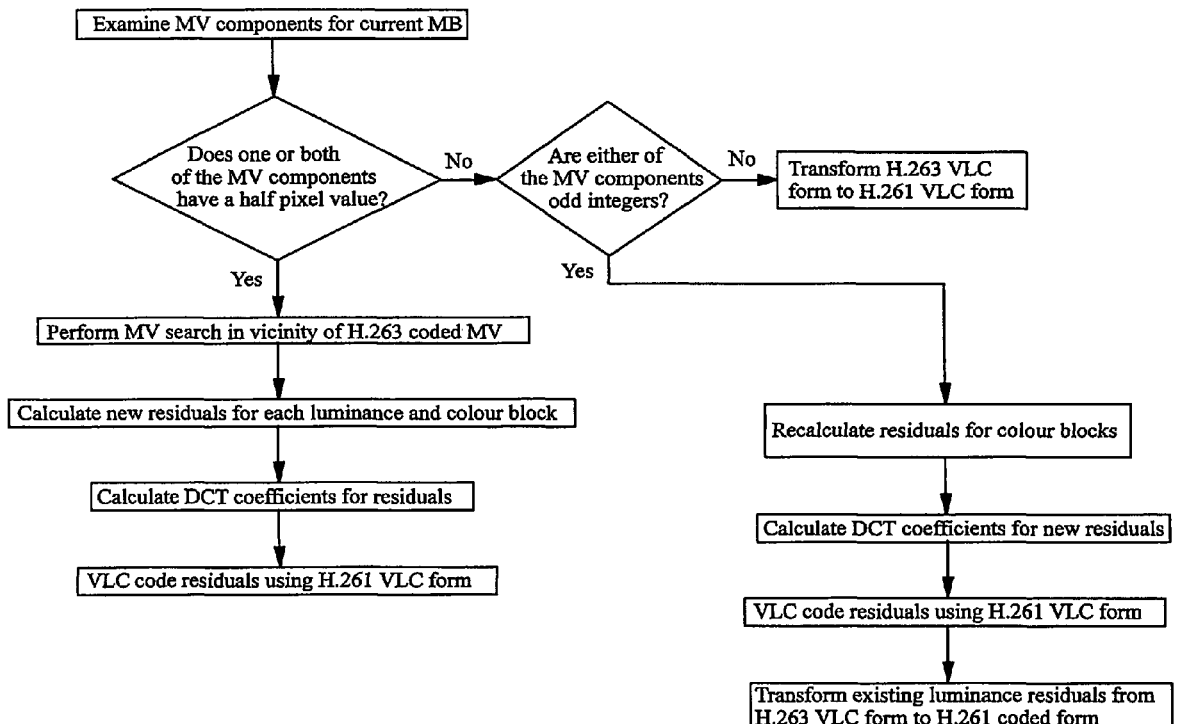
FIG. 2 is a flow diagram illustrating a method of transcoding from an H.263 coded video signal to an H.261 coded video signal.
Figure 3:
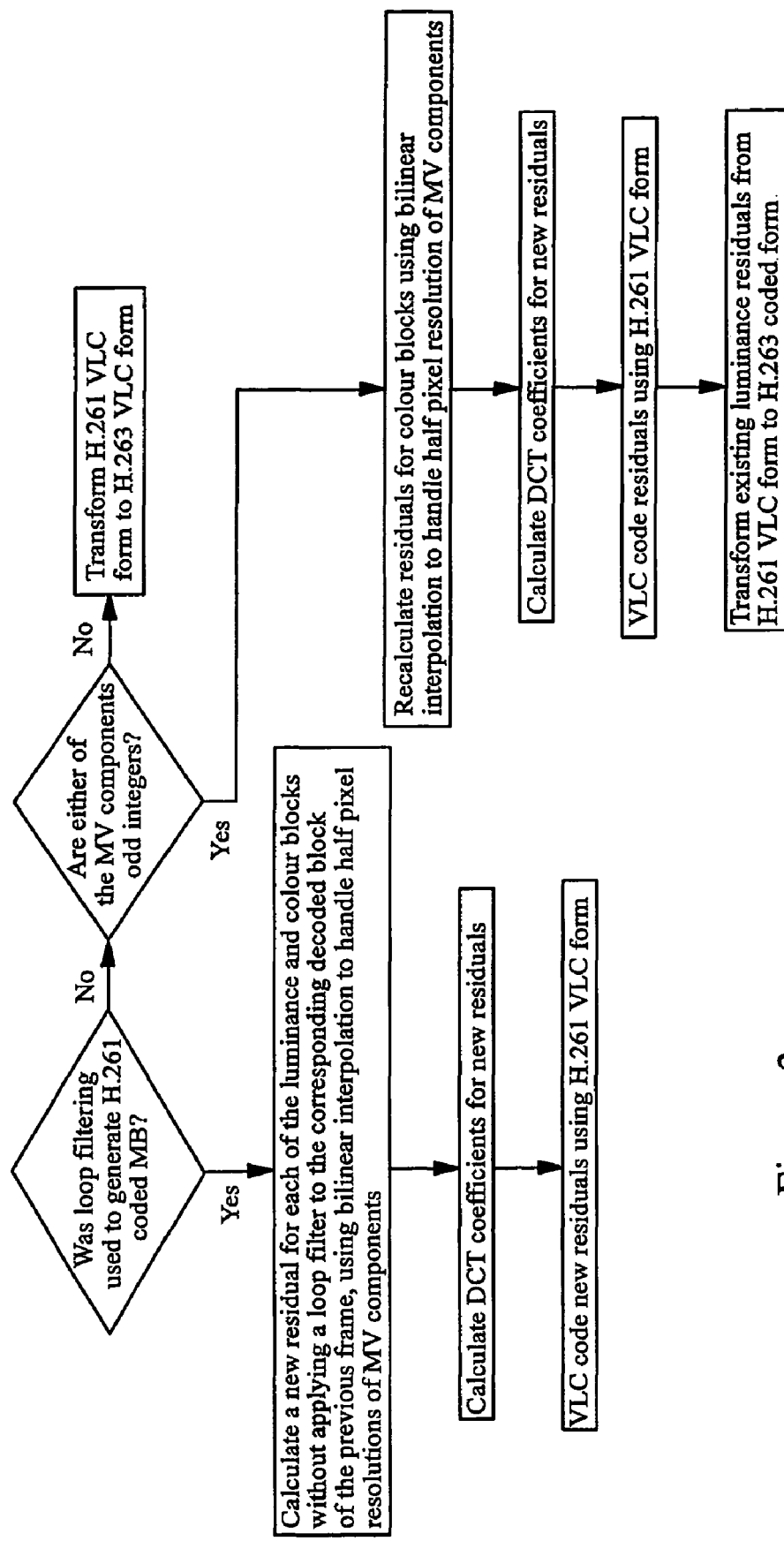
FIG. 3 is a flow diagram illustrating a method of transcoding from an H.261 coded video signal to an H.263 coded video signal.

There is illustrated in FIG. 1 a system for communicating video signals between an ISDN terminal 1 and a 3GPP mobile terminal 2. The ISDN terminal 1 is connected to a Public Switched Telephone Network (PSTN) 3 whilst the mobile terminal 2 is connected to a 3GPP mobile network 4. The PSTN and 3GPP networks are coupled together via an interworking node 5 which, whilst shown separately in FIG. 1, may be located in the PSTN or 3GPP networks or indeed in another network interconnecting the PSTN and 3GPP networks. One of the functions of the interworking node 5 is to perform transcoding of signals between the respective standards used by the ISDN and 3GPP terminals.

As part of a video "conference" between the two terminals 1, 2, video signals are exchanged. As already mentioned, the ISDN terminal 1 codes video signals generated at that terminal according to the H.261 standard. The ISDN terminal 1 also expects to receive incoming video signals coded using the same standard. On the other hand, the mobile terminal 2 codes video signals generated at that terminal according to the H.263 standard and expects to receive incoming video signals coded using the H.263 standard. Transcoding is performed at the interworking node 5 to overcome this mismatch of coding standards. For a detailed explanation of the two coding standards, reference should be made to the relevant ITU-T documents. However, for the purpose of illustration, a brief explanation of each will now be provided.

H.263 Coding

The video signal provided to the coding unit at the 3GPP compatible terminal 2 comprises a sequence of frames, each of which consists of an array of pixels defined by red (R), green (G), and blue components (B). Taking each frame in turn, the coding unit sub-divides the frame into 16×16 pixel macro blocks (MB). For each MB, the RGB pixel values are converted into luminance (Y) values, blue difference chrominance values (Cb), and red difference chrominance values (Cr). The luminance values have the same spatial resolution as the RGB pixels, and are divided into four 8×8 blocks per MB (referred to hereinafter as "luminance blocks"). The chrominance values have a spatial resolution which is half that of the RGB pixels in both dimensions, so that there is one 8×8 blue difference chrominance block and one 8×8 red difference chrominance block per MB (referred to hereinafter as "colour blocks"). Coding is carried out on a per MB basis, using the luminance and colour blocks of that MB.

A complete frame may be marked to be either INTRA or INTER coded by a parameter (PTYPE) in the header part of a frame. In addition, the header of each MB of an INTER coded MB contains an indicator which marks an individual MB as either INTRA or INTER coded.

Taking the first frame in a sequence, H.263 uses INTRA coding to code the MBs of that frame. INTRA coding involves for each of the luminance and colour blocks of a MB, determining a set of Discrete Cosine Transform (DCT) coefficients which can be used to predict that block. In order to compress the block still further, the DCT coefficients are quantised, zig-zag scanned, run-length coded, and finally coded using variable length Huffman coding (VLC). The actual coded frame consists of a frame header portion and a MB headers portion, followed by the individual MB coded data. The header portions are typically VLC coded separately from the MB data.

As the data present in any given frame is more often than not related to the data present in the preceding frame, frames after the first frame in a sequence are coded using INTER coding. Following the generation of the luminance and colour blocks for each MB, a motion search is performed for a MB by using the luminance pixels to find that shift which best fits the MB to (a corresponding 16×16 pixel area of) the preceding frame. This shift is referred to as the "motion vector" (MV) for the MB and forms part of the compressed MB. The MV has x and y components and is determined to a resolution of one half pixel by using bilinear interpolation to handle the full pixel resolution used for the luminance pixel array.

Once a MV has been determined for a MB, the residual is computed for the luminance blocks of the MB relative to the previous frame, shifted by the MV. The process is repeated for the two colour blocks, except that that the MV is divided in two due to the lower resolution of the colour blocks. For each luminance and colour block, a DCT is applied to the residuals. The DCT coefficients are quantised, zig-zag scanned and run-length coded. Finally the coefficients and other data are coded using Huffman VLC.

It is noted that where a MB contains no relevant information (e.g. all quantised DCT coefficients are equal to zero), the MB header will indicate this to avoid the need for subsequent coding and transmission of the parameters of the MB. This MB may be skipped during the decoding process and the pixels of the MB are copied from the previous decoded frame based upon the assumption that nothing has changed in the corresponding picture area.

H.261 Coding

This form of coding is similar in principal to the H.263 coding described above. The main differences are as follows:

The form of VLC used to code the DCT coefficient (and other data) is different to that used by H.263.

The resolution with which H.261 coding calculates the MV is one pixel and not one half pixel.

H.261 coding applies loop filtering (a bilinear low pass filtering) to a decoded previous block shifted by the MV prior to computing the residual for a block of the current frame. Both unfilterd and filtered residuals for each block of a MB are calculated, one of which is selected for further processing according to which gives the lower signal power and consequently can be coded with less bits. The choice is signalled further towards the decoding side by a parameter (MTYPE) of a MB-header.

By taking into account these differences and, crucially, the points in the coding process when they occur, it is possible to formulate a transcoding mechanism which significantly reduces the require computational effort as compared to the brute force method.

H.263 to H.261 Transcoding

At the interworking node 5 of the system of FIG. 1, when a first, INTRA coded frame is received, transcoding is a simple matter of converting the H.263 VLC form to the H.261 VLC form. This may be achieved by providing a lookup table mapping the two different sets of VLC codes. Each INTRA coded MB, as well as each INTER coded MB, is reconstructed at the interworking node as part of the transcoding process. However, reconstruction (or decoding) is not computationally intensive when compared to coding.

The interworking node 5 analyses the frame on a MB by MB basis. For each INTER coded MB which does not contain only zero coefficients, the node 5 examines the MV. If either of the x and y components have a half pixel value (e.g. 1.5, 2.5, etc), then a new MV search must be conducted. This requires that the current H.263 decoded MB be compared against the previous decoded frame. The new MV search is limited to the two full pixel shifts on either side of the MV of the H.263 coding if only one of the components has a half pixel value, and to the four full pixel shifts surrounding the MV if both components have a half pixel value. Thus for example if the H.263 coded MV is (7, 6.5) then the search will examine the candidate MVs (7, 6) and (7, 7) to find the best fit. If the H.263 coded MV is (4.5, −2.5) then the search will examine the candidate MVs (4, −3), (4, −2), (5, −3), and (5, −2).

Using the new MV, residuals are computed for each of the luminance and colour blocks, based on the decoded form of the previous H.261 coded frame (this gives better results than using the decoded previous H.263 frame directly). Respective sets of DCT coefficients calculated (NB. calculation of the residuals for the colour blocks uses a modified form of the MV—see below). The quantised, zig-zag scanned and run-length coded DCT coefficients and other data are VLC coded into H.261 form.

In the event that the examination of a MV for a MB determines that neither of the MV components has a half pixel value, it is then determined whether or not either has a value which is an odd integer. During the H.261 decoding, the colour blocks of a MB of the previous frame must be shifted relative to the corresponding colour blocks of the current frame using the MV. However, because the resolution of the colour blocks is half that of the luminance block (and hence half that of the MV), the MV components must be divided in two to determine the shift of the colour blocks. The H.261 decoding rounds the divided MV components towards zero (i.e. negative values upwards and positive values downwards), and shifts the colour blocks by the rounded values (i.e. $MV_{colour}=TRUNC(MV/2)$. H.263 decoding on the other hand uses the divided vales directly, even if these involve a half pixel component because half pixel resolution for the MVs can be handled in H.263 with the help of bilinear interpolation. H.261 coding takes account of the rounding of MV components in the residuals for the colour blocks—H.263 does not. Therefore, if one or both of the components are odd integers, the residuals are recalculated for the colour blocks (using the divided and rounded MV). It will be appreciated that this process does not however require recalculation of the MV, nor does it require recalculation of the residuals for the luminance block of the MB). It is noted that recalculation of the residuals for the colour blocks, taking account of the divided and rounded MV, is carried out automatically if one or both of the MV components are determined to have a half pixel value.

In summary, for H.263 to H.261 transcoding of an INTER coded MB, if both of the MV components are even integers, only mapping of the VLC coded DCT coefficients is required. If one or both of the MV components have half pixel values, a limited MV search must be carried out, followed by recalculation of the residuals and DCT coefficients for the luminance and colour blocks. The results are coded using the appropriate VLC form. If one of the MV components is an odd integer, and the other does not have a half pixel value, no further MV search is required—only the residuals for the colour blocks need to be recalculated.

When at least one of the components of an H.263 coded MV is not an integer, a loop filter (as specified for H.261) may or may not be applied to the corresponding predicted MB of the previous frame. However, application of a loop filter will typically result in an improvement in the perceived quality of the displayed video although it does require more processing capacity.

H.261 to H.263 Transcoding

Transcoding of INTRA coded frames or MBs again requires only a transformation of the VLC coding. Two checks are performed for each INTER coded MB. If the answers to both of these checks are no, then only transformation of the VLC coding is required.

The first check is to see if the H.263 coding applied a loop filter to the previous decoded and MV shifted block when coding the present MB. This can be determined from a flag in the MB header. If the answer is yes, then the residuals for the luminance and chrominance blocks of the current MB are recalculated, this time without applying the loop filter to the previous decoded and MV shifted block. The residuals are DCT coded, quantised, zig-zag scanned, run-length coded, and finally VLC coded. No further MV search is required.

The second check is to see if either of the MV components is an odd integer. If so, then the H.261 coded residuals for the colour blocks will have been calculated based on the previous corresponding colour blocks shifted by the TRUNC(MV/2) as described above. The H.263 residuals for the colour blocks must be recalculated, using the half pixel MV/2 together with the bilinear interpolation method defined for H.263 coding. Again, no further MV search is required, and indeed it is not necessary to recalculate the residual for the luminance block. This second check is only required if the answer to the first check was no, as if loop filtering was used, recalculation of the colour blocks will automatically use a half pixel shift of MV/2 where appropriate, and the necessary bilinear interpolation.

A further enhancement to the perceived quality of the transcoded signal (H.261 to H.263) may be achieved if a mini search for a half pixel resolution H.263 MV is made on the eight half pixel positions in the immediate vicinity of the full pixel H.261 MV. For example, in the vicinity of a full pixel MV (3, 4) there are the following eight half pixel MV candidates: (2.5, 3.5), (2.5, 4), (2.5, 4.5), (3, 3.5), (3, 4.5), (3.5, 3.5), (3.5, 4) and (3.5, 4.5). This requires more processing capacity than above, but still less than the brute force transcoding approach. The mini search can be made for every INTER coded MB or, in order to save the average processing power, only for those MBs which indicate that loop filtering has been used on the H.261 side. Recomputing and coding of residual is of course required if a more optimal half pixel MV is found in the mini search.

It will be appreciated by the person of skill in the art that various modifications may be made to the above described embodiment without departing from the scope of the present invention. For example, in addition to video conferencing, the present invention may be applied for example to streaming video transmission. It will also be appreciated that various transformations for parsing between different embodiments of the H.261 and H.263 standards may be necessary. However, these will be readily apparent to the skilled person. It will also be appreciated that the present invention may be applied to other transcoding processes, for example transcoding between H.263 and MPEG.

The invention claimed is:

1. A method of transcoding from H.263 coded video frames to H.261 coded video frames both of which comprise VLC parameters, the method comprising for each INTER coded macro block (MB) of each frame:
   determining whether a component of the motion vector (MV) of the MB has a half pixel value;
   if yes, carrying out a MV search using the current H.263 decoded MB and a previous decoded frame to determine a new MV, the MV search being restricted to the vicinity of the H.263 coded MV; and
   coding the MB into an H.261 format using the new MV.

2. The method according to claim 1, wherein said previous decoded frame is the previously decoded H.261 frame within the transcoder.

3. The method according to claim 2, wherein, when a new MV search is carried out, said vicinity of the MV consists of the two integer pixel locations on each side of the half pixel component where one of the MV components has a half pixel value, and consists of the four integer pixel locations surrounding the MV where both of the MV components have half pixel values.

4. The method according to claim 3, wherein said step of coding the frame into an H.261 format using the new MV comprises calculating a residual for each luminance and color block by subtracting corresponding blocks of a previous decoded frame, shifted by the new MV or a value derived from the new MV, from the current H.263 decoded blocks.

5. The method according to claim 4, wherein, when calculating the residuals for the luminance and color blocks, the blocks are shifted by an amount which is the truncation of the new MV divided by 2.

6. The method according to claim 5, wherein, if a component of the MV for a given MB has an odd integer value, and the other component does not have a half pixel value, the residuals for the luminance and color blocks are recalculated using a MV which is the value of the original MV divided by 2 and rounded towards zero.

7. The method according to claim 6, wherein, for MBs which have a MV having a half pixel component, loop filtering is applied to the corresponding decoded MV-shifted block of the previous frame when recalculating residuals.

8. A method of transcoding between H.263 coded video frames and H.261 coded video frames, the method comprising for each INTER coded macro block (MB) of each frame:
   determining whether the motion vector (MV) for that block comprises a component which is an odd integer and, if so, recalculating the residuals for at least each of the color blocks of the MB.

9. The method according to claim 1, wherein, if neither of the MV components has a half pixel value or is an odd integer, the VLC coded data is transcoded from the H.263 form to the H.261 form.

10. A transcoder for providing an interface between an H.263 capable video telephony terminal and an H.261 capable video telephony terminal, wherein for macro blocks (MBs) which have a motion vector (MV) having a half pixel component and wherein a block of a previous frame is decoded and MV-shifted, the transcoder being adapted for applying loop filtering to the corresponding decoded MV-shifted block of the previous frame when recalculating residuals.

11. A transcoder for providing an interface between an H.263 capable video telephony terminal and an H.261 capable video telephony terminal, the transcoder being adapted, for each INTER coded macro block (MB), for determining whether the motion vector (MV) for that block comprises a component which is an odd integer and, if so, recalculating the residuals for each of the color blocks of the MB.

12. A transcoder for providing an interface between an H.263 capable video telephony terminal and an H.261 capable video telephony terminal, the transcoder, wherein both H.263 and H.261 formats can represent a macro block (MB) of a given frame using a motion vector (MV) defining a displacement of the MB relative to a preceding frame, and wherein the H.263 format specifies MV components to a resolution of a half pixel and the H.261 format specifies MV components to a resolution of one pixel, the method comprising, for each INTER coded macro block (MB) of each frame:

determining whether a component of the motion vector (MV) of the MB has a half pixel value;

if yes, carrying out a MV search using the cLirrent decoded MB and a previous decoded frame to determine a new MV, the MV search being restricted to the vicinity of the original MV; and coding the MB into H.261 format using the new MV.

\* \* \* \* \*